United States Patent [19]
Martinez

[11] 3,743,098
[45] July 3, 1973

[54] SPIRAL MASS TRANSFER DEVICE WITH LOW FLOW RESISTANCE AND FLUID VOLUME

[75] Inventor: Felix Jesus Martinez, Palatine, Ill.

[73] Assignee: Baxter Laboratories, Inc., Morton Grove, Ill.

[22] Filed: Dec. 23, 1971

[21] Appl. No.: 211,412

[52] U.S. Cl. ................................ 210/321, 210/494
[51] Int. Cl. ........................................... B01d 31/00
[58] Field of Search ........................... 210/321, 494

[56] References Cited
UNITED STATES PATENTS
3,508,662   4/1970   Miller ........................... 210/494 X Primary Examiner—Frank A. Spear, Jr.
Attorney—W. Garrettson Ellis

[57] ABSTRACT

A mass transfer device such as an artificial kidney is disclosed which describes a foraminous screen member supporting and lying against a length of semipermeable membrane of flattened tubular shape. The screen member and membrane are arranged in a spiral about a core, the screen member comprising first and second sets of spaced parallel strands in separate planes. The sets of strands lie against each other and define an angle thereto, and are connected to each other at their crossing points. One of the sets of strands is disposed in longitudinal relation to the axis of the tubular membrane. The strands of the longitudinally arranged set have center lines which are spaced apart from each other by a distance which is preferably at least twice the corresponding spacing distance between the strands of the other set.

12 Claims, 5 Drawing Figures

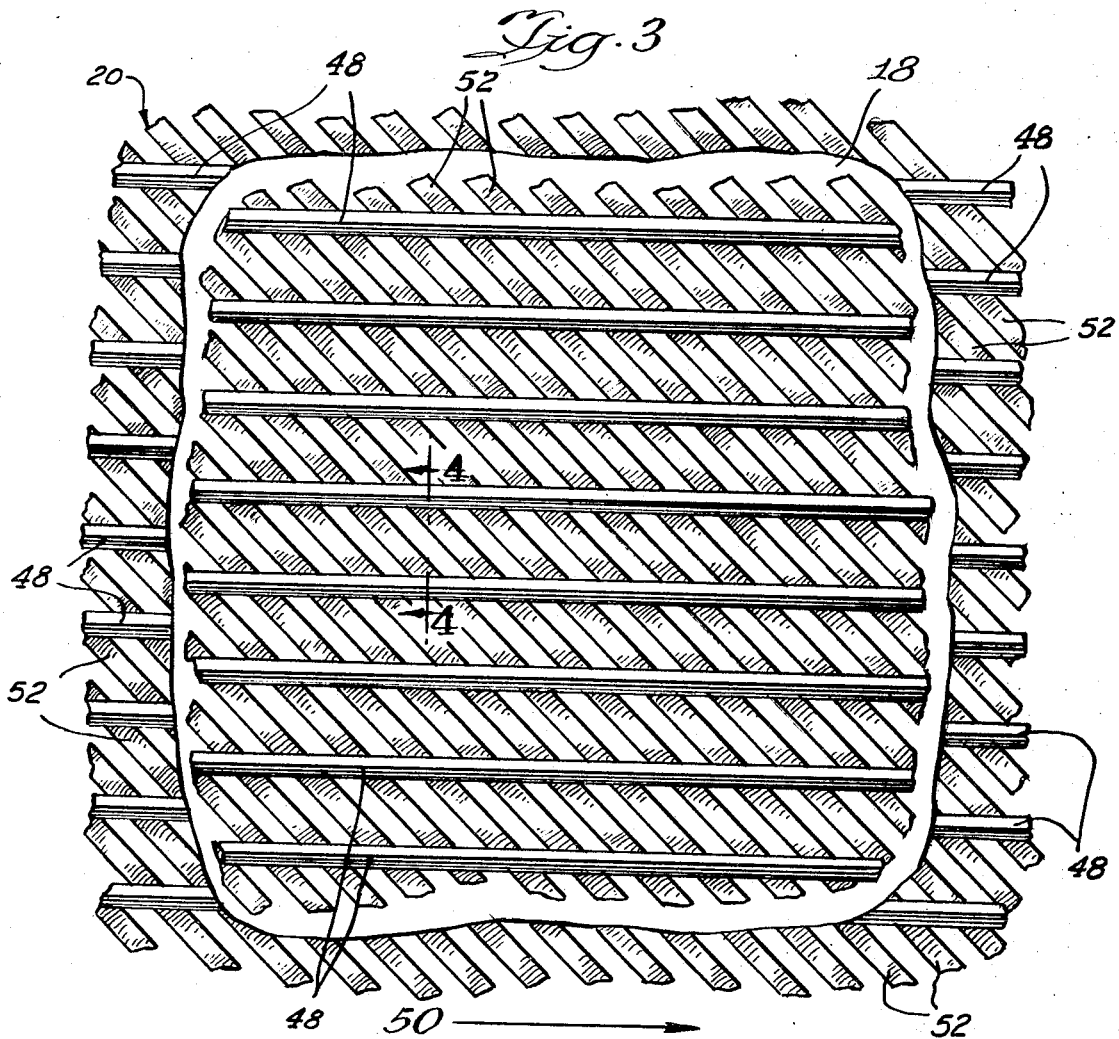
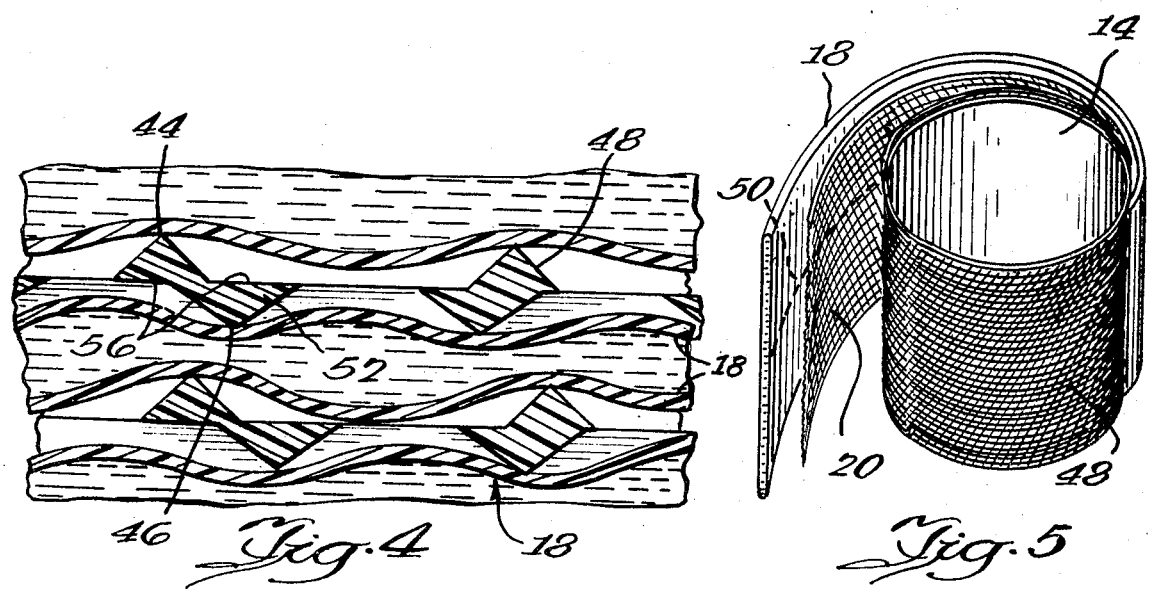

SPIRAL MASS TRANSFER DEVICE WITH LOW FLOW RESISTANCE AND FLUID VOLUME

BACKGROUND OF THE INVENTION

Coil dialyzers utilizing flattened tubing and screening wrapped together around a core constitute the currently favored design for artificial kidneys which dialyze blood to remove urea, creatinine, and other body waste products in patients who have impaired kidney function.

Many expert physicians in the field of dialysis require that their patients on dialysis restrict their intake of fluids at all times. Correspondingly, these physicians require that the dialyzers used by the patients provide only a moderate amount of ultrafiltration to avoid excessive water loss in the patient.

The term "ultrafiltration" refers to the capacity of water to pass from the blood to the dialysis solution through the semipermeable membrane. The rate of ultrafiltration is quite dependent upon the difference in pressure between the blood side and the dialysis solution side of the dialyzer.

Accordingly, there is a need for dialyzers in which the pressure drop of blood flowing along the membrane is relatively low, to keep the rate of ultrafiltration low. To obtain reduced pressures, as is indicated in U.S. Pat. No. 3,508,662 (as well as in previous published work by Louis W. Bluemle, Jr. — *Progress Report, 1 November, 1960 to 31 October, 1961, Development of Blood Dialyzer-Ultrafiltrator*, supported by the Research and Development Division, Office of the Surgeon General, Contract No. DA-49-007-MD-707), one set of strands of crossing, nonwoven, parallel strand netting is oriented in a direction longitudinal to the coiled membrane tubing.

A problem with this arrangement, however, is that in the screening conventionally used, the volume of the blood in the dialysis tubing of the coil dialyzer is higher than desirable if the screening strands are spaced apart widely enough to reduce the pressure to desired levels. It is desirable for the blood volume of the dialyzer to be an absolute minimum.

In the invention of this application, a coil dialyzer is disclosed in which reduced back pressure is encountered by blood passing through the dialysis tubing, while at the same time the blood volume within the dialysis tubing is also reduced.

DESCRIPTION OF THE INVENTION

In accordance with this invention, a mass transfer device such as a dialyzer for blood comprises a foraminous screen member supporting and lying against a length of semipermeable membrane of flattened tubular shape. The screen member and membrane are arranged in a spiral about a core with the screen member comprising first and second sets of spaced parallel strands in separate planes. The sets of strands lie against each other and define an angle, and are connected to each other at their crossing points. The first set of strands is disposed in a longitudinal relation to the axis of the tubular membrane, the strands of the first set having centerlines which are spaced apart from each other by a distance which is greater than the corresponding spacing distance between the strand centerlines of the second set.

It has been unexpectedly discovered that the spacing between the first set of strands, which are disposed in longitudinal relation to the tubular membrane axis, strongly influences the flow resistance or pressure drop encountered by blood or other fluid flowing through the spirally arranged tubular membrane, with increased strand spacing reducing the pressure drop. However, the spacing between the second set of strands which crosses the first set has been found to strongly influence the fluid volume within the tubular membrane without having a very strong influence on the pressure drop. In this case, the closer together the strands of the second set are, the lower the fluid volume is in the tubular membrane. Thus the purposes of this invention can be achieved by utilizing a screen member in which the first longitudinal set of strands has greater strand spacing than the second set of strands, to provide larger flow channels between strands in the longitudinal direction.

Preferably, the first set of strands has from two to about three times greater spacing distance between strand centerlines than the second set. When blood or other fluid of similar viscosity is passed through the semipermeable tubing, it is desirable for the centerlines of the strands of the first set to be spaced apart from 0.10 to 0.14 inch, while the strands of the second set have centerlines spaced apart from each other by about 0.05 to 0.09 inch. Preferably, the spacing of the first set of strands is 0.12 to 0.13 inch, while the second strands are spaced 0.06 to 0.08 inch, most preferably in a ratio of about 2 to 1, although the advantages of this invention can be achieved at other ratios. For example, spacing between the first strands can advantageously be from 0.11 to 0.13 inch, and the second strand spacing about 0.08 inch, when triangular strands having a base of about 0.03 inch and an elevation of about 0.02 to 0.03 inch are used. The strands preferably are triangular in cross section, of approximately equilateral shape, having a base of 0.01 to 0.04 inch and an altitude of 0.01 to 0.04 inch, the first and second sets defining an angle to each other of about 40° to 60°.

In the specific embodiment described below, a dialyzer for blood is shown utilizing a cellulosic membrane. However, if desired, blood oxygenators utilizing known oxygenation membranes such as silicone rubber, or porous polytetrafluoroethylene or polypropylene, can be constructed in accordance with this invention. Also, dialyzers and reverse osmosis devices for other purposes can be constructed using the principles of this invention.

In the drawings,

FIG. 3 is a magnified, detailed view showing how screening of this invention is arranged with respect to the semipermeable membrane tubing used herein.

FIG. 4 is a highly detailed sectional view taken along line 4—4 of FIG. 3.

FIG. 5 is a diagramatic view of an unrolled coil dialyzer of this invention showing the arrangement of the screening of this invention with respect to the tubular semipermeable membrane.

Figure 1:
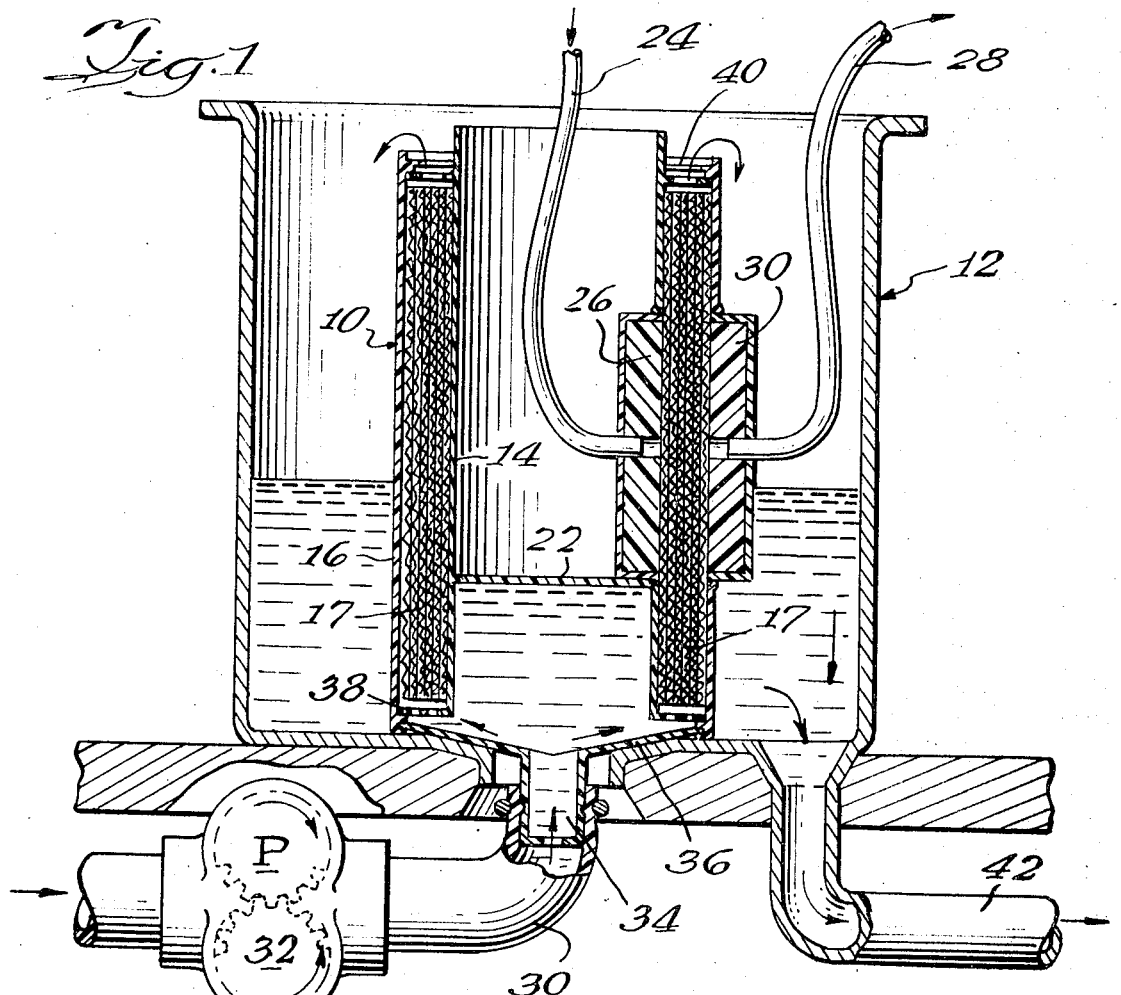
FIG. 1 is an elevational view, partly in section, of a coil dialyzer of this invention shown in its environment of use.

Referring to FIG. 1, a dialyzer of this invention is generally shown in its conventional position of use. Dialyzer 10 rests in a canister 12 for holding dialysis solution. Dialyzer 10 includes an inner core 14 and a casing 16 which encloses the spirally wrapped arrangement 17 of dialysis tubing 18 and screening 20, the method of wrapping and the specific arrangement of which is shown in FIGS. 3 to 5. Casing 16 and core 14 can be manufactured as a single, integral structure, if desired. Core 14 defines an optional bottom wall 22 to block upward flow of dialysis fluid.

Blood inlet 24 provides blood to the interior of semipermeable tubing 18 at one end of tubing 18 by means of an elastic adapter 26, more fully described in U.S. Pat. application Ser. No. 26,547, filed Apr. 8, 1970, while blood outlet 28 is connected to the interior of tubing 18 at its other end by a second adapter 30 of similar construction. Thus, the blood passes through the entire length of semipermeable tubing in a spiral path about core 14 for dialysis against solution which percolates through the screening 20 outside tubing 18 in the following manner:

The dialysis solution enters the device through conduit 30, typically impelled by a pump 32 of any known type, the specific type shown herein for exemplary purposes being a rotary gear pump. Dialysis solution passes into short tube 34, which is integral with a conical piece 36 of the dialyzer 10. Tube 34 is held in place in tube 30 by a frictional fit. Dialysis solution then passes through a porous ring 38, which serves to hold the spiral array 17 of dialysis tubing 18 and screening 20 in position. From there, dialysis solution percolates upwardly within the coils of screening 20 through the spiral array 17, spilling out from coil dialyzer 10 at its annular outlet 40 into canister 12. An outlet 42 then conveys the dialysis solution away for recirculation or disposal, as desired.

In accordance with this invention, the screening 20 used herein comprises an extruded plastic netting having two sets of parallel strands lying against each other and defining an angle to each other. As is well known, this type of screening provides a series of flow channels which greatly reduces the flow resistance of blood and dialysis solution through the coil dialyzer without the use of separate spacers.

Figure 2:
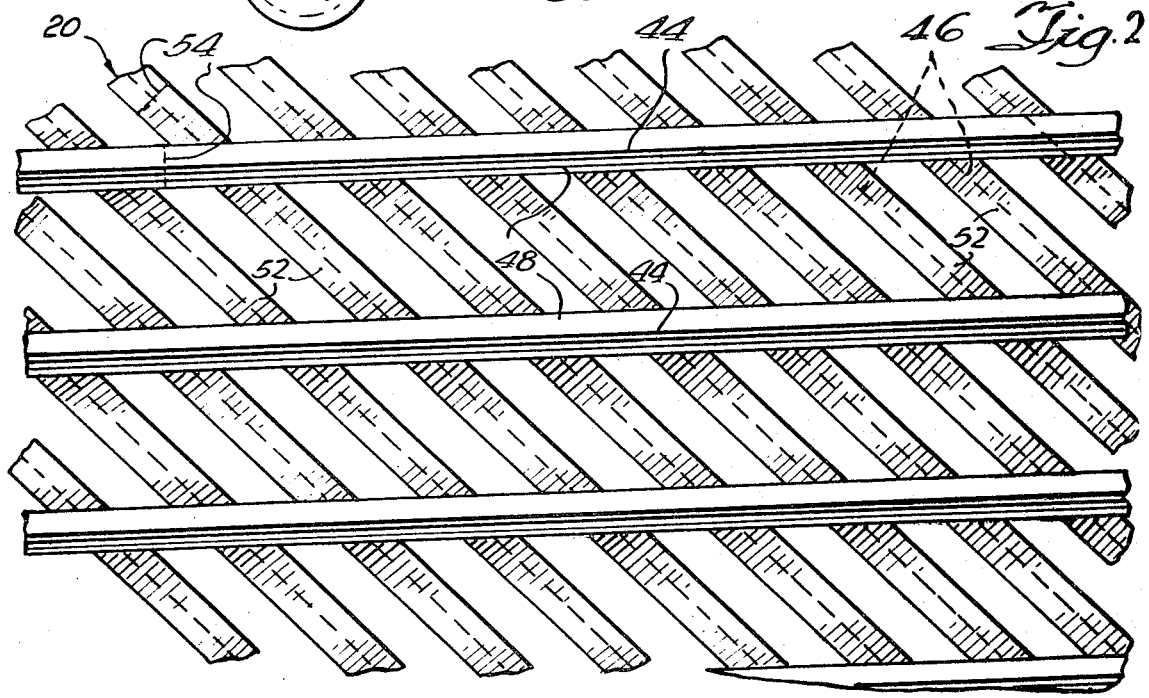
FIG. 2 is a highly magnified plan view of a preferred embodiment of the screening used in this invention.

The individual plastic strands are preferably triangular in cross section, which provides substantial advantage as described in South African Pat. application No. 71/1185, particularly in that less surface area of the dialysis membrane is covered by the strands since the apexes 44, 46 of the strands of each set (FIGS. 2 and 4) provide a pointed ridge directed outwardly for support of the dialyzer membrane with less masking of the membrane.

As shown in FIGS. 2 through 5, the screening arrangement used herein defines a first set of strands 48 which runs parallel to the longitudinal, spiral axis 50 of the dialysis tubing (FIG. 5). Strands 48 are shown to have spacing between adjacent center lines (which are coincident with apexes 44 in FIG. 2) of about 0.125 inch. The second set of strands 52 lies against strands 48, defining about a 45° angle thereto, although a wide range of crossing angles between strands 48 and 52 can be effectively utilized in the device of this invention. The spacing between the apexes and centerlines 46 of adjacent strands 52 is shown to be about 0.06 inch. Both strands 48 and 52 are shown to have a base width 54 of about 0.03 inch, and a height of about 0.025 inch (FIG. 4), measured by dropping a perpendicular from each respective apex 44, 46 to each base 56.

The screening specifically disclosed herein provides an optimum balance of a low back pressure against the flow of blood through the dialyzer, coupled with a low blood volume in the blood flow path of the dialyzer. The adjustment of the spacing between the strands of the first and second sets and adjustment of the shape and size of the strands provides differing blood volume and back pressure characteristics to the device, as may be desired.

Referring more particularly to FIG. 4, there is shown the general cross sectional shape that the screening of this invention impresses upon the tubular dialysis membrane. The apparent difference in size between strands 48 and 52 reflects the fact that the view of FIG. 4 is sectionally taken perpendicular to strands 48 and at an angle to strands 52. The two walls of tubular membrane 18 are shown between two coils of screening (strands 48 and 52), and an additional single wall of adjacent coils of tubular membrane are shown for purposes of illustration. The entire drawing is vertically expended for clarity.

The above is for illustrative purposes only, and is not intended to limit the invention of this application, which is as defined in the claims below.

That which is claimed is:

1. A mass transfer device which comprises a foraminous screen member supporting and lying against a length of semipermeable membrane of flattened tubular shape, said screen member and membrane being arranged in a spiral about a core, said screen member comprising first and second sets of spaced parallel strands in separate planes, said sets of strands lying against each other and defining an angle thereto, and connected to each other at their crossing points, the first set of strands being disposed in longitudinal relation to the axis of the tubular membrane, the strands of said first set having center lines spaced apart from each other by a distance which is two to about three times the corresponding spacing distance between the strands of said second set.

2. The mass transfer device of claim 1 in which said strands are generally triangular in cross section, and in which said triangular strand elements are, in cross section, 0.01 to 0.04 inch in height from apex to base, and said base is 0.01 to 0.04 inch in width, and said angle between the first and second strand elements is 40° to 60°.

3. The mass transfer device of claim 2 in which said first strands have centerlines spaced 0.12 to 0.14 inch apart and the second strands are spaced 0.06 to 0.07 inch apart.

4. The mass transfer device of claim 3 which is an artificial kidney having a blood flow path through said tubular membrane.

5. The mass transfer device of claim 4 in which said first strand elements are parallel to the axis of said tubular membrane.

6. A mass transfer device which comprises a foraminous screen member supporting and lying against a length of semipermeable membrane of flattened tubular shape, said screen member and membrane being arranged in a spiral about a core, said screen member comprising a first set of spaced parallel strands and a second set of spaced parallel strands in a separate plane lying against said first set of strands and defining an angle thereto, said first and second sets of strands being connected to each other at their crossing points, said first set of strands being disposed in longitudinal relation to the axis of said tubular membrane and spaced apart from each other from 0.1 to 0.14 inch, to provide a low pressure drop of fluid flowing through said tubular membrane, the second set of strands being spaced apart from each other by 0.05 to 0.09 inch, to provide a low fluid volume within said tubular membrane.

7. The mass transfer device of claim 6 in which the spacing of said first strands is from 0.11 to 0.13 inch and the spacing of said second strands is about 0.08 inch, said first and second strands having a triangular cross section with outwardly directed apexes, said cross section having a base of about 0.03 inch and an elevation of 0.02 to 0.03 inch.

8. The mass transfer device of claim 7 which is an artificial kidney having a blood flow path through said tubular membrane.

9. A mass transfer device which comprises a foraminous screen member supporting and lying against a length of semipermeable membrane of flattened tubular shape, said screen member and membrane being arranged in a spiral about a core, said screen member comprising a first set of spaced parallel strands and a second set of spaced parallel strands in a separate plane lying against said first strands and defining an angle thereto, said first and second strands being connected to each other at their crossing points, each strand providing a pointed ridge, the point of which is directed outwardly in a direction substantially normal to the plane of said screen member, the ridges of said strands providing support for said dialyzing tubing and defining a plurality of fluid flow channels between said strands, the first strands being disposed in longitudinal relation to the axis of said tubular membrane and having centerlines spaced apart from 0.10 to 0.14 inch to provide a low pressure drop for fluid flowing through said tubular membrane, the second strands having centerlines spaced apart from each other by 0.05 to 0.09 inch to provide a low fluid volume within said tubular membrane.

10. The mass transfer device of Claim 6 in which the spacing of said first strands is from 0.11 to 0.13 inch, and the spacing of said second strands is about 0.08 inch.

11. The mass transfer device of Claim 6 in which said first and second sets of strands define an angle to each other of about 40° to 60°.

12. The mass transfer device of Claim 6 in which said strands are triangular in cross section of approximately equilateral shape, having a base of 0.01 to 0.04 inch and an altitude of 0.01 to 0.04 inch.

* * * * *

UNITED STATES PATENT OFFICE
CERTIFICATE OF CORRECTION

Patent No. 3,743,098　　　　　　　Dated July 3, 1973

Inventor(s) MARTINEZ, FELIX JESUS

It is certified that error appears in the above-identified patent and that said Letters Patent are hereby corrected as shown below:

Column 3, line 43, cancel "application".

Signed and sealed this 25th day of December 1973.

(SEAL)
Attest:

EDWARD M. FLETCHER, JR.　　　　RENE D. TEGTMEYER
Attesting Officer　　　　　　　　Acting Commissioner of Patents